United States Patent
Izumikawa

(10) Patent No.: US 10,934,689 B2
(45) Date of Patent: Mar. 2, 2021

(54) SHOVEL

(71) Applicant: SUMITOMO(S.H.I.) CONSTRUCTION MACHINERY CO., LTD., Tokyo (JP)

(72) Inventor: Takeya Izumikawa, Chiba (JP)

(73) Assignee: SUMITOMO(S.H.I.) CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 16/143,938

(22) Filed: Sep. 27, 2018

(65) Prior Publication Data

US 2019/0024347 A1    Jan. 24, 2019

Related U.S. Application Data

(63) Continuation of application No. PCT/JP2017/012361, filed on Mar. 27, 2017.

(30) Foreign Application Priority Data

Mar. 30, 2016    (JP) ................... 2016-068537

(51) Int. Cl.
*E02F 9/26* (2006.01)
*E02F 3/32* (2006.01)
(Continued)

(52) U.S. Cl.
CPC ............... *E02F 9/264* (2013.01); *E02F 3/32* (2013.01); *B60R 1/00* (2013.01); *B60R 2300/105* (2013.01); *E02F 9/20* (2013.01)

(58) Field of Classification Search
CPC ..... E02F 9/264; E02F 3/32; B60R 1/00; B60R 2300/105; B60R 2300/30
See application file for complete search history.

(56) References Cited

U.S. PATENT DOCUMENTS

2006/0140497 A1* 6/2006 Kondo ............... G06T 7/74
382/254
2014/0100744 A1* 4/2014 Johnson ............ G01S 19/48
701/50

(Continued)

FOREIGN PATENT DOCUMENTS

EP        2876220        5/2015
JP     S62-169061 U    10/1987
(Continued)

OTHER PUBLICATIONS

International Search Report for PCT/JP2017/012361 dated Apr. 25, 2017.

*Primary Examiner* — Rufus C Point
(74) *Attorney, Agent, or Firm* — IPUSA, PLLC

(57) ABSTRACT

A shovel includes a traveling undercarriage, an upper rotating structure swingably mounted on the traveling undercarriage, an attachment attached to the upper rotating structure and including a boom, an arm, and a bucket, a guidance device configured to guide an operation of the attachment, and a display device configured to display information related to work by the attachment. The guidance device is configured to display multiple distance indicating parts with respect to the width direction of the bucket on the display device. The distance indicating parts schematically indicate relative distances to a target surface.

12 Claims, 14 Drawing Sheets

(51) Int. Cl.
*E02F 9/20* (2006.01)
*B60R 1/00* (2006.01)

(56) References Cited

U.S. PATENT DOCUMENTS

| | | | |
|---|---|---|---|
| 2016/0010312 A1 | 1/2016 | Kurihara et al. | |
| 2016/0024757 A1 | 1/2016 | Nomura et al. | |
| 2016/0186410 A1* | 6/2016 | Shioji | E02F 9/26 296/190.1 |
| 2016/0230553 A1* | 8/2016 | Kuramoto | E21D 9/108 |
| 2016/0237654 A1 | 8/2016 | Arimatsu et al. | |
| 2016/0289928 A1* | 10/2016 | Kitajima | E02F 3/3677 |
| 2017/0114526 A1* | 4/2017 | Yasuda | E02F 9/264 |
| 2017/0175362 A1* | 6/2017 | Iwanaga | G01S 19/43 |
| 2018/0051446 A1* | 2/2018 | Yoshinada | B60R 1/00 |

FOREIGN PATENT DOCUMENTS

| | | |
|---|---|---|
| JP | 2001-004376 | 1/2001 |
| JP | 2004-068433 | 3/2004 |
| JP | 2013-087577 | 5/2013 |
| JP | 2014-101664 | 6/2014 |
| JP | 2014-205955 | 10/2014 |
| JP | 2016-160741 | 9/2016 |
| WO | 2015/173935 | 11/2015 |

\* cited by examiner

SHOVEL

CROSS-REFERENCE TO RELATED APPLICATIONS

This application is a continuation application filed under 35 U.S.C. 111(a) claiming benefit under 35 U.S.C. 120 and 365 (c) of PCT International Application No. PCT/JP2017/012361, filed on Mar. 27, 2017 and designating the U.S., which claims priority to Japanese patent application No. 2016-068537, filed on Mar. 30, 2016. The entire contents of the foregoing applications are incorporated herein by reference.

BACKGROUND

Technical Field

The present invention relates to shovels.

Description of Related Art

According to shovels with a machine guidance function, for example, the relative distance of a bucket to a target surface is displayed on the screen of a display device installed diagonally in front of an operator seat.

For example, there is a shovel that sets measurement reference points for measuring a bucket position at multiple points on a bucket, calculates the measurement reference point closest to a target surface, and displays the relative distance of the bucket position closest to the target surface to the target surface. The relative distance is displayed in a single (one-piece) distance display part.

SUMMARY

According to an aspect of the present invention, a shovel includes a traveling undercarriage, an upper rotating structure swingably mounted on the traveling undercarriage, an attachment attached to the upper rotating structure and including a boom, an arm, and a bucket, a guidance device configured to guide an operation of the attachment, and a display device configured to display information related to work by the attachment. The guidance device is configured to display multiple distance indicating parts with respect to the width direction of the bucket on the display device. The distance indicating parts schematically indicate relative distances to a target surface.

DETAILED DESCRIPTION

According to the above-described shovel, the relative distance of the bucket position closest to the target surface to the target surface is displayed in a single distance information part. Therefore, when the bucket position closest to the target surface automatically changes because of a change in the bucket position and a change in the target surface caused by excavation, an operator cannot intuitively determine of which position on the bucket the relative distance to the target surface displayed in the distance display part is.

A shovel operator normally performs work while looking at the tips of teeth of a bucket or an excavation site positioned in front of an operator seat, and therefore, cannot look at a display device for a long time during work. Accordingly, the shovel operator can look at the display device for an extremely short time during work, and may have difficulty in checking desired information from an image displayed on the display device within the time.

According to an embodiment of the present invention, a shovel including a display device that allows an operator to accurately and intuitively understand the relative distance of a bucket to a target surface without concentrating on a display screen is provided.

According to an aspect of the present invention, an operator can accurately and intuitively understand the relative distance of a bucket to a target surface without concentrating on a display screen.

One or more embodiments of the present invention are described with reference to the accompanying drawings.

Figure 1:
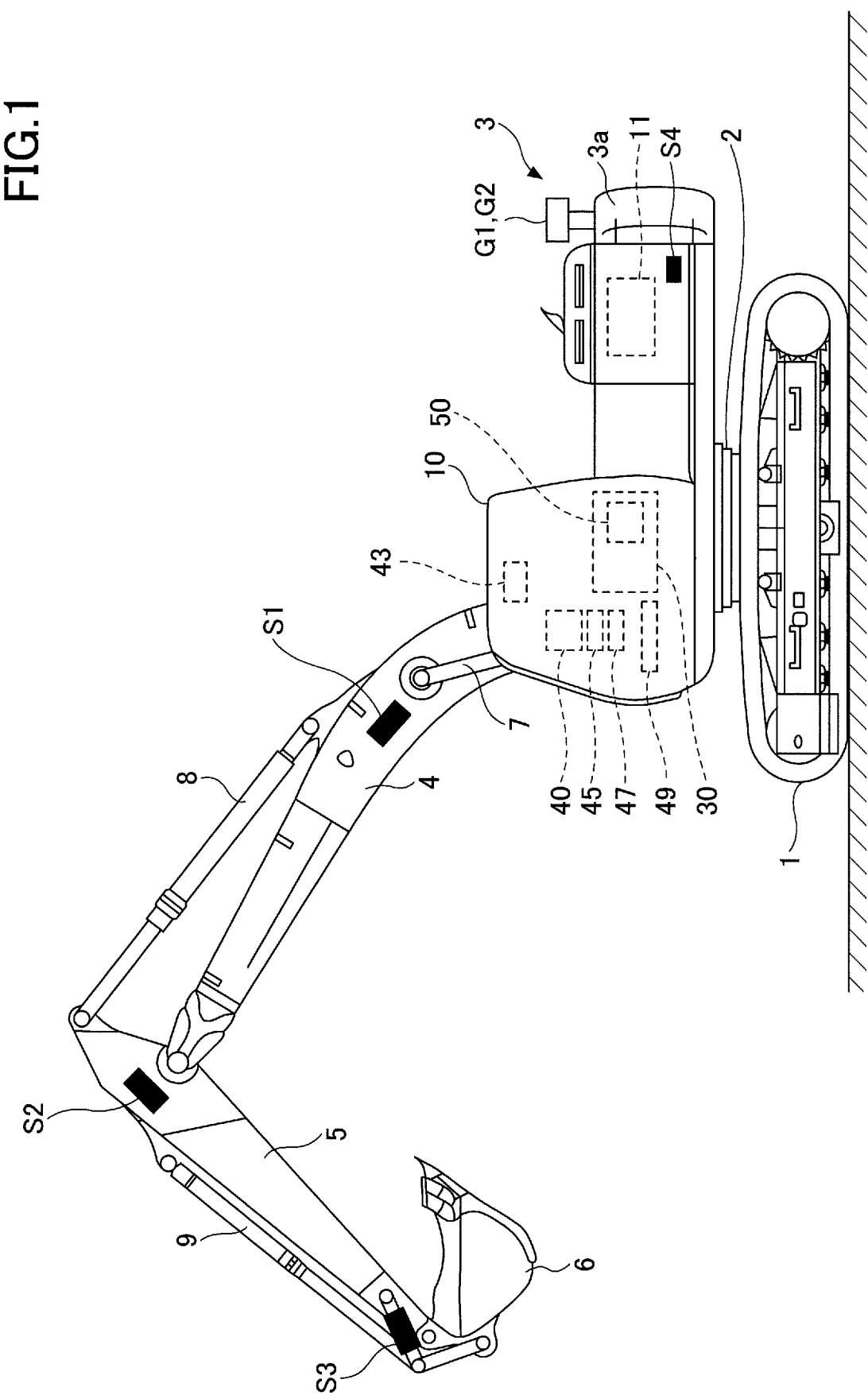
FIG. 1 is a side view illustrating a shovel according to an embodiment.

FIG. 1 is a side view illustrating a shovel according to an embodiment.

An upper rotating structure 3 is mounted on a traveling undercarriage 1 of the shovel via a swing mechanism 2. A boom 4 is attached to the upper rotating structure 3. An arm 5 is attached to an end of the boom 4. A bucket 6 serving as an end attachment (a working part) is attached to an end of the arm 5. A slope bucket, a dredging bucket, a breaker or the like may alternatively be attached as an end attachment.

The boom 4, the arm 5, and the bucket 6 form an excavation attachment as an example of an attachment, and are hydraulically driven by a boom cylinder 7, an arm cylinder 8, and a bucket cylinder 9, respectively. A boom angle sensor S1 is attached to the boom 4. An arm angle sensor S2 is attached to the arm 5. A bucket angle sensor S3 is attached to the bucket 6. A bucket tilt mechanism may be provided on the excavation attachment. The boom angle sensor S1, the arm angle sensor S2, and the bucket angle sensor S3 may be referred to as "posture sensors."

The boom angle sensor S1 detects the rotation angle of the boom 4. For example, the boom angle sensor S1 is an acceleration sensor that detects the rotation angle of the boom 4 relative to the upper rotating structure 3 by detecting an inclination to a horizontal plane.

The arm angle sensor S2 detects the rotation angle of the arm 5. For example, the arm angle sensor S2 is an acceleration sensor that detects the rotation angle of the arm 5 relative to the boom 4 by detecting an inclination to a horizontal plane.

The bucket angle sensor S3 detects the rotation angle of the bucket 6. For example, the bucket angle sensor S3 is an acceleration sensor that detects the rotation angle of the bucket 6 relative to the arm 5 by detecting an inclination to a horizontal plane.

When the excavation attachment is provided with a bucket tilt mechanism, the bucket angle sensor S3 additionally detects the rotation angle of the bucket 6 about a tilt axis. The boom angle sensor S1, the arm angle sensor S2, and the bucket angle sensor S3 may alternatively be potentiometers using a variable resistor, stroke sensors that detect the stroke amount of a corresponding hydraulic cylinder, or rotary encoders that detect a rotation angle about a connecting pin.

Power sources such as an engine 11 and a body tilt sensor S4 are mounted on the upper rotating structure 3 and covered with a cover 3a. The body tilt sensor S4 detects the tilt angle of the upper rotating structure 3. For example, the body tilt sensor S4 is an acceleration sensor that detects the tilt angle of the upper rotating structure 3 by detecting an inclination to a horizontal plane.

GPS devices (GNSS receivers) G1 and G2 are provided on top of the cover 3a of the upper rotating structure 3. The GPS devices G1 and G2 detect the position of the shovel using a GPS function, and feed position data to a machine guidance device 50 in a controller 30. The controller 30, a display device 40, an audio output device 43, an input device 45, and a storage device 47 are provided in a cabin 10.

The controller 30 operates as a main control part to control the driving of the shovel. The controller 30 is composed of a processing unit including a CPU and an internal memory. The CPU executes a program stored in the internal memory to implement various functions of the controller 30.

The controller 30 also operates as the machine guidance device 50 to guide shovel operations. For example, the machine guidance device 50 notifies an operator of work information such as the distance between a target surface that is the surface of a target terrain set by the operator and the working part of the attachment. The distance between the target surface and the working part of the attachment is, for example, the distance between the target surface, and the end (teeth tips) of the bucket 6 as an end attachment and the back surface of the bucket 6. The machine guidance device 50 notifies the operator of work information through the display device 40, the audio output device 43, etc., to guide shovel operations.

While the machine guidance device 50 is incorporated into the controller 30 according to this embodiment, the machine guidance device 50 and the controller 30 may alternatively be provided separately. In this case, like the controller 30, the machine guidance device 50 is composed of a processing unit including a CPU and an internal memory. The CPU executes a program stored in the internal memory to implement various functions of the machine guidance device 50.

The display device 40 displays an image including various kinds of work information in response to a command from the machine guidance device 50 included in the controller 30. The display device 40 is, for example, an in-vehicle liquid crystal display connected to the machine guidance device 50.

The audio output device 43 outputs various kinds of audio information in response to an audio output command from the machine guidance device 50 included in the controller 30. The audio output device 43 includes, for example, an in-vehicle speaker connected to the machine guidance device 50. The audio output device 43 may include an alarm such as a buzzer.

The input device 45 is a device for inputting various kinds of information to the controller 30 including the machine guidance device 50 by the operator of the shovel. The input device 45 includes, for example, a membrane switch provided on the surface of the display device 40. The input device 45 may include a touchscreen or the like.

The storage device 47 is a device for storing various kinds of information. The storage device 47 is, for example, a non-volatile storage medium such as a semiconductor memory. The storage device 47 stores various kinds of information output by the controller 30 including the machine guidance device 50, etc.

A gate lock lever 49 is a mechanism provided between the door and the operator seat of the cabin 10 to prevent the shovel from being accidentally operated. When the operator climbs onto the operator seat and pulls up the gate lock lever 49, the operator is prevented from getting out of the cabin 10 and various operating apparatuses become operable. When the operator pushes down the gate lock lever 49, the operator can get out of the cabin 10 and various operating apparatuses become inoperable.

Figure 2:
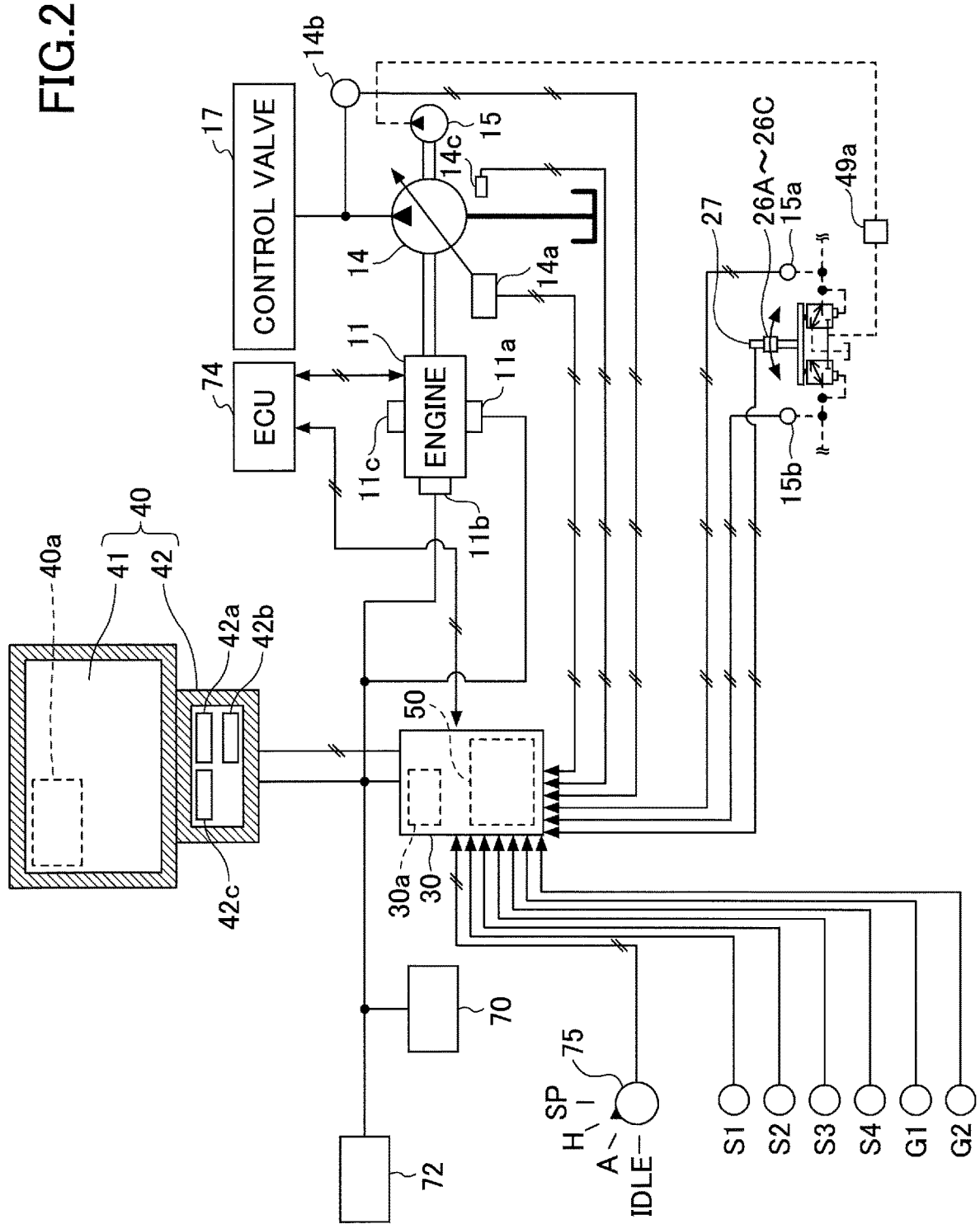
FIG. 2 is a diagram illustrating a configuration of connections including a controller of the shovel.

FIG. 2 is a diagram illustrating a configuration of connections including the controller 30 of the shovel according to the embodiment.

The display device 40 is provided in the cabin 10 to display an image including work information fed from the machine guidance device 50, etc. The display device 40 is connected to the controller 30 including the machine guidance device 50 via a communications network such as a Controller Area Network (CAN) or a Local Interconnect Network (LIN), a dedicated line, etc.

The display device 40 includes a conversion part 40a to generate an image to be displayed on an image display part 41.

The conversion part 40a converts, into an image signal, data to be displayed on the image display part 41 among various kinds of data input to the display device 40 from the controller 30. The data input to the display device 40 from the controller 30 include, for example, data indicating the temperature of engine coolant water, data indicating the temperature of hydraulic oil, data indicating the remaining amount of an aqueous urea solution, data indicating the remaining amount of fuel, etc.

The conversion part 40a outputs an image signal after conversion to the image display part 41 to display an image generated based on various kinds of data on the image display part 41.

The conversion part 40a may be provided in not the display device 40 but, for example, the controller 30. The display device 40 includes a switch panel 42 serving as an input part. The switch panel 42 is a panel including various kinds of hardware switches. The switch panel 42 includes a light switch 42*a*, a windshield wiper switch 42*b*, and a window washer switch 42*c*.

The light switch 42*a* is a switch for turning on and off lights attached to the exterior of the cabin 10. The windshield wiper switch 42*b* is a switch for moving and stopping a windshield wiper. The window washer switch 42*c* is a switch for spraying windshield washer fluid.

The display device 40 is supplied with electric power from a rechargeable battery 70 to operate. The rechargeable battery 70 is charged with electric power generated in an alternator 11*a* (generator) of the engine 11. The electric power of the rechargeable battery 70 is also supplied to electrical equipment 72, etc., of the shovel besides the controller 30 and the display device 40. Furthermore, a starter 11*b* of the engine 11 is driven with electric power from the rechargeable battery 70 to start the engine 11.

The engine 11 is connected to a main pump 14 and a pilot pump 15, and is controlled by an engine control unit (ECU) 74. Various data indicating the condition of the engine 11 (for example, data indicating coolant water temperature (a physical quantity) detected with a water temperature sensor 11*c*, etc.) are constantly transmitted from the ECU 74 to the controller 30. The controller 30 can store these data in an internal temporary storage part (memory) 30*a* and suitably transmit the data to the display device 40.

The main pump 14 is a hydraulic pump for supplying hydraulic oil to a control valve 17 via a high-pressure hydraulic line. The main pump 14 is, for example, a swash-plate variable displacement hydraulic pump.

The pilot pump 15 is a hydraulic pump for supplying hydraulic oil to various hydraulic control apparatuses via a pilot line. The pilot pump 15 is, for example, a fixed displacement hydraulic pump.

The control valve 17 is a hydraulic controller to control the hydraulic system of the shovel. For example, the control valve 17 selectively supplies hydraulic oil discharged by the main pump 14 to the boom cylinder 7, the arm cylinder 8, the bucket cylinder 9, traveling hydraulic motors, a swing hydraulic motor, etc. In the following, the boom cylinder 7, the arm cylinder 8, the bucket cylinder 9, the traveling hydraulic motors, and the swing hydraulic motor may be referred to as "hydraulic actuators."

Operating levers 26A through 26C are provided in the cabin 10 to be used by the operator to operate hydraulic actuators. When the operating levers 26A through 26C are operated, hydraulic oil is supplied from the pilot pump 15 to the pilot ports of flow control valves corresponding to hydraulic actuators. Each pilot port is supplied with hydraulic oil of a pressure commensurate with the direction of operation and the amount of operation of a corresponding one of the operating levers 26A through 26C.

According to this embodiment, the operating lever 26A is a boom operating lever. The operator can hydraulically drive the boom cylinder 7 to operate the boom 4 when operating the operating lever 26A. The operating lever 26B is an arm operating lever. The operator can hydraulically drive the arm cylinder 8 to operate the arm 5 when operating the operating lever 26B. The operating lever 26C is a bucket operating lever. The operator can hydraulically drive the bucket cylinder 9 to operate the bucket 6 when operating the operating lever 26C. Besides the operating levers 26A through 26C, operating levers, operating pedals, etc., for driving the traveling hydraulic motors, the swing hydraulic motor, etc., may be provided in the shovel.

The controller 30 obtains, for example, various kinds of data described below. The data obtained by the controller 30 are stored in the temporary storage part 30*a*.

A regulator 14*a* of the main pump 14, which is a variable displacement hydraulic pump, transmits data indicating a swash plate angle to the controller 30. Furthermore, a discharge pressure sensor 14*b* transmits data indicating the discharge pressure of the main pump 14 to the controller 30. These data (data representing physical quantities) are stored in the temporary storage part 30*a*. Furthermore, an oil temperature sensor 14*c* provided in a conduit between the main pump 14 and a tank storing hydraulic oil that the main pump 14 draws in transmits data representing the temperature of hydraulic oil flowing through the conduit to the controller 30.

Pressure sensors 15*a* and 15*b* detect a pilot pressure transmitted to the control valve 17 when the operating levers 26A through 26C are operated, and transmit data indicating the detected pilot pressure to the controller 30. The operating levers 26A through 26C are provided with a switch button 27. The operator can transmit a command signal to the controller 30 by operating the switch button 27 while operating the operating levers 26A through 26C.

An engine rotational speed adjustment dial 75 is provided in the cabin 10 of the shovel. The engine rotational speed adjustment dial 75 is a dial for adjusting the rotational speed of the engine 11, and, for example, can switch the engine rotational speed in a stepwise manner. According to this embodiment, the engine rotational speed adjustment dial 75 is provided to make it possible to switch the engine rotational speed among the four levels of SP mode, H mode, A mode, and idling mode. The engine rotational speed adjustment dial 75 transmits data indicating the setting of the engine rotational speed to the controller 30. FIG. 2 illustrates a state where the H mode is selected by the engine rotational speed adjustment dial 75.

The SP mode is a rotational speed mode selected when it is desired to prioritize workload, and uses the highest engine rotational speed. The H mode is a rotational speed mode selected when it is desired to satisfy both workload and fuel efficiency, and uses the second highest engine rotational speed. The A mode is a rotational speed mode selected when it is desired to operate the shovel with low noise while prioritizing fuel efficiency, and uses the third highest engine rotational speed. The idling mode is a rotational speed mode selected when it is desired to idle the engine 11, and uses the lowest engine rotational speed. The engine 11 is controlled to a constant rotational speed at the engine rotational speed of the rotational speed mode set by the engine rotational speed adjustment dial 75.

Figure 3:
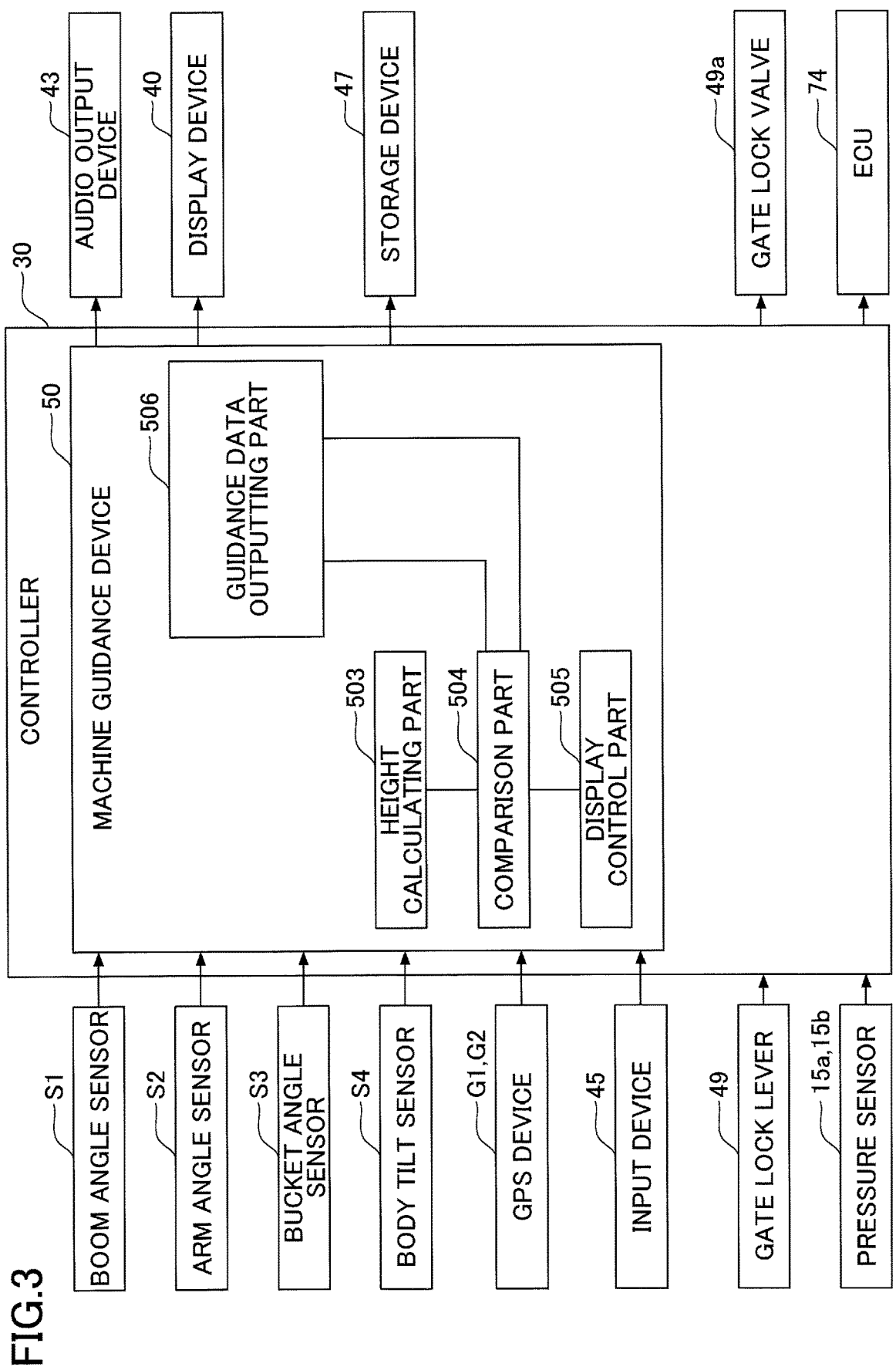
FIG. 3 is a diagram illustrating a configuration of the controller and a machine guidance device.

Next, various functions provided in the controller 30 and the machine guidance device 50 of the shovel are described. FIG. 3 is a diagram illustrating a configuration of the controller 30 and the machine guidance device 50 according to the embodiment.

The controller 30 controls the operation of the entire shovel including the ECU 74. The controller 30 performs control to close a gate lock valve 49*a* when the gate lock lever 49 is pushed down and to open the gate lock valve 49*a* when the gate lock lever 49 is pulled up. The gate lock valve 49*a* is a selector valve provided in an oil passage between the control valve 17 and the operating levers 26A through 26C, etc. Here, the gate lock valve 49*a* is configured to be opened or closed based on a command from the controller 30. Alternatively, the gate lock valve 49*a* may be mechanically connected to the gate lock lever 49 to be opened or closed in response to the operation of the gate lock lever 49.

The gate lock valve 49a is closed to interrupt a flow of hydraulic oil between the control valve 17 and the operating levers 26A through 26C, etc., to disable the operating levers 26A through 26C, etc. The gate lock valve 49a is opened to allow passage of hydraulic oil between the control valve 17 and the operating levers 26A through 26C, etc., to enable the operating levers 26A through 26C, etc.

The controller 30 detects the amount of operation of each lever from a pilot pressure detected by the pressure sensor 15a or 15b with the gate lock valve 49a being opened to have the operating levers 26A through 26c enabled.

In addition to controlling the operation of the entire shovel, the controller 30 controls whether to give guidance by the machine guidance device 50. Specifically, in response to determining that the shovel is not working, the controller 30 transmits a guidance stop command to the machine guidance device 50 to stop guidance by the machine guidance device 50.

The controller 30 may output a guidance stop command to the machine guidance device 50 when outputting an automatic idling stop command to the ECU 74. Alternatively, the controller 30 may output a guidance stop command to the machine guidance device 50 in response to determining that the gate lock lever 49 is pushed down.

Next, the machine guidance device 50 is described. The machine guidance device 50 receives various signals and data supplied to the controller 30, from the boom angle sensor S1, the arm angle sensor S2, the bucket angle sensor S3, the body tilt sensor S4, the GPS device G1, the input device 45, etc.

The machine guidance device 50 receives information pertaining to the shape of the bucket 6 input by the input device 45. The information pertaining to the shape of the bucket 6 includes information such as the opening height and the opening width, the distance from the teeth tips to the back surface, the teeth length, etc., of the bucket 6. Furthermore, the machine guidance device 50 stores target surface information input by the input device 45, including the depth of the target surface and the angle of the target surface, in the storage device 47. The target surface information may be three-dimensional terrain data. In this case, the terrain data are desirably associated with latitude, longitude, and altitude.

The machine guidance device 50 calculates the actual operating position of the attachment such as the bucket 6 based on the received signals and data. Then, the machine guidance device 50 compares the actual operating position of the attachment and the target surface, and calculates, for example, the distance between the bucket 6 and the target surface. The machine guidance device 50 also calculates the distance from the swing central axis of the shovel to the teeth ends of the bucket 6, the inclination angle of the target surface, etc., and transmits these to the display device 40 as work information.

When the machine guidance device 50 and the controller 30 are provided separately, the machine guidance device 50 and the controller 30 are connected through CAN (Controller Area Network) to be able to communicate with each other.

The machine guidance device 50 includes a height calculating part 503, a comparison part 504, a display control part 505, and a guidance data outputting part 506.

The height calculating part 503 calculates the height of the end (teeth tips) of the bucket 6 from the angles of the boom 4, the arm 5, and the bucket 6 determined from the detection signals of the boom angle sensor S1, the arm angle sensor S2, and the bucket angle sensor S3.

The comparison part 504 compares the height of the end (teeth tips) of the bucket 6 calculated by the height calculating part 503 and the position of the target surface shown in guidance data output by the guidance data outputting part 506. The comparison part 504 according to this embodiment compares the height of the position of the center of the teeth tips of the bucket 6 as a "representative position" and the position of the target surface. Furthermore, the comparison part 504 compares the respective heights of the left position and the right position of the teeth tips (specifically, the position of the left end and the position of the right end of the teeth tips) of the bucket 6 as "positions other than the representative position" and the positions of the target surface corresponding to the left position and the right position, and compares the height of the back surface of the bucket 6 and the position of the target surface.

The comparison part 504 calculates a relative distance to the target surface at the representative position of the bucket 6 and a relative distance to the target surface at the "positions other than the representative position" of the bucket 6. Various data determined in the comparison part 504 are stored in the storage device 47.

The display control part 505 transmits the height of the bucket 6 and the relative distances to the target surface as determined by the comparison part 504 to the display device 40 as work information. The display device 40 displays the work information transmitted from the display control part 505 on the screen. A display screen configuration of the display device 40 is described below. The display control part 505 can change the contents of a notification on the display screen of the display device 40 and change the sound of notification to the operator through the audio output device 43, in accordance with the relative distances between positions on the bucket 6 (the position of the center of the teeth tips, the position of the back surface, etc.) and the target surface. Furthermore, in such cases where the bucket 6 is positioned lower than the target surface, the display control part 505 can display a warning on the display screen of the display device 40 and issue an alarm to the operator through the audio output device 43.

Figure 4:
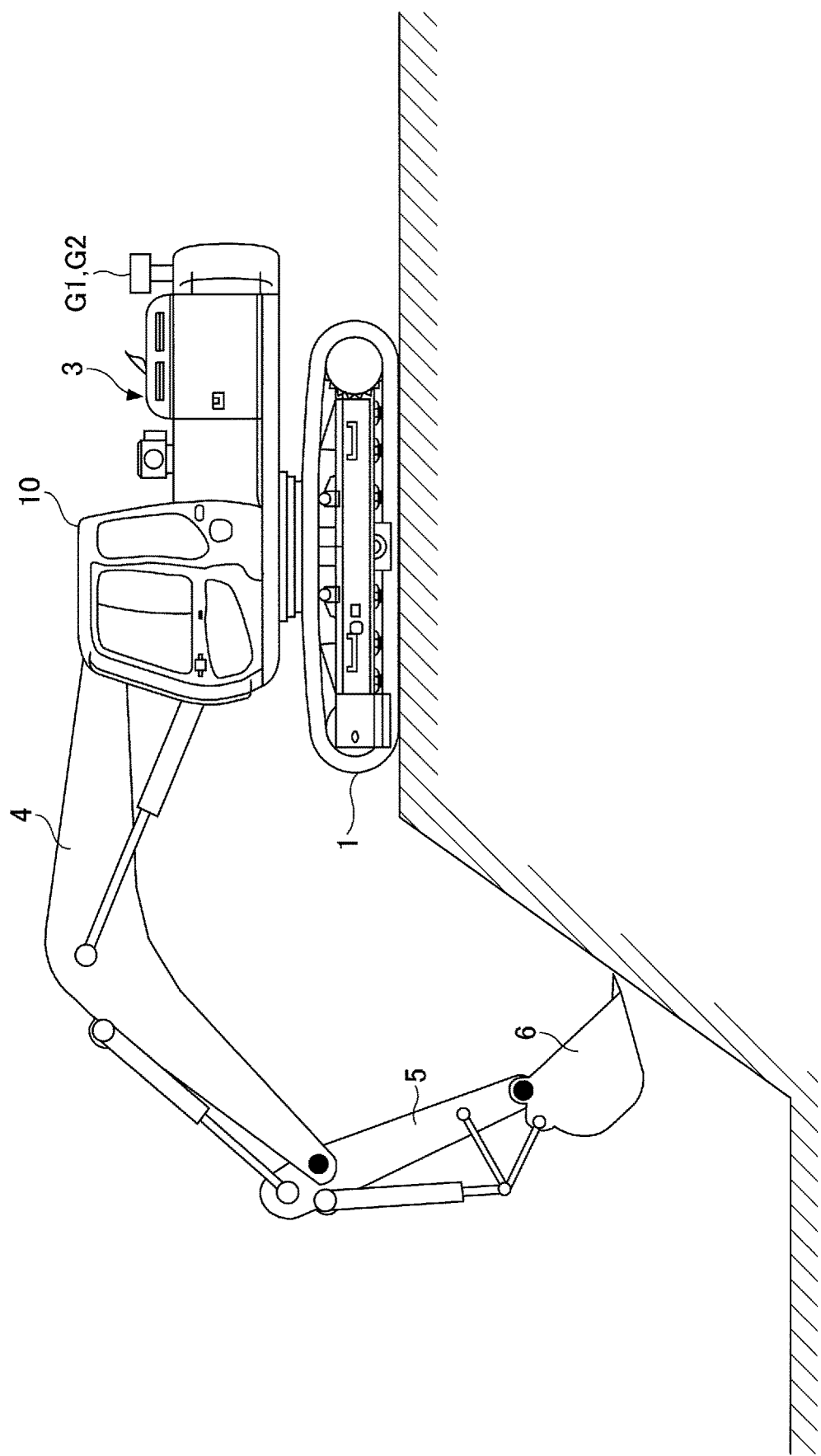
FIG. 4 is a diagram illustrating slope excavating work by the shovel.
Figure 5:
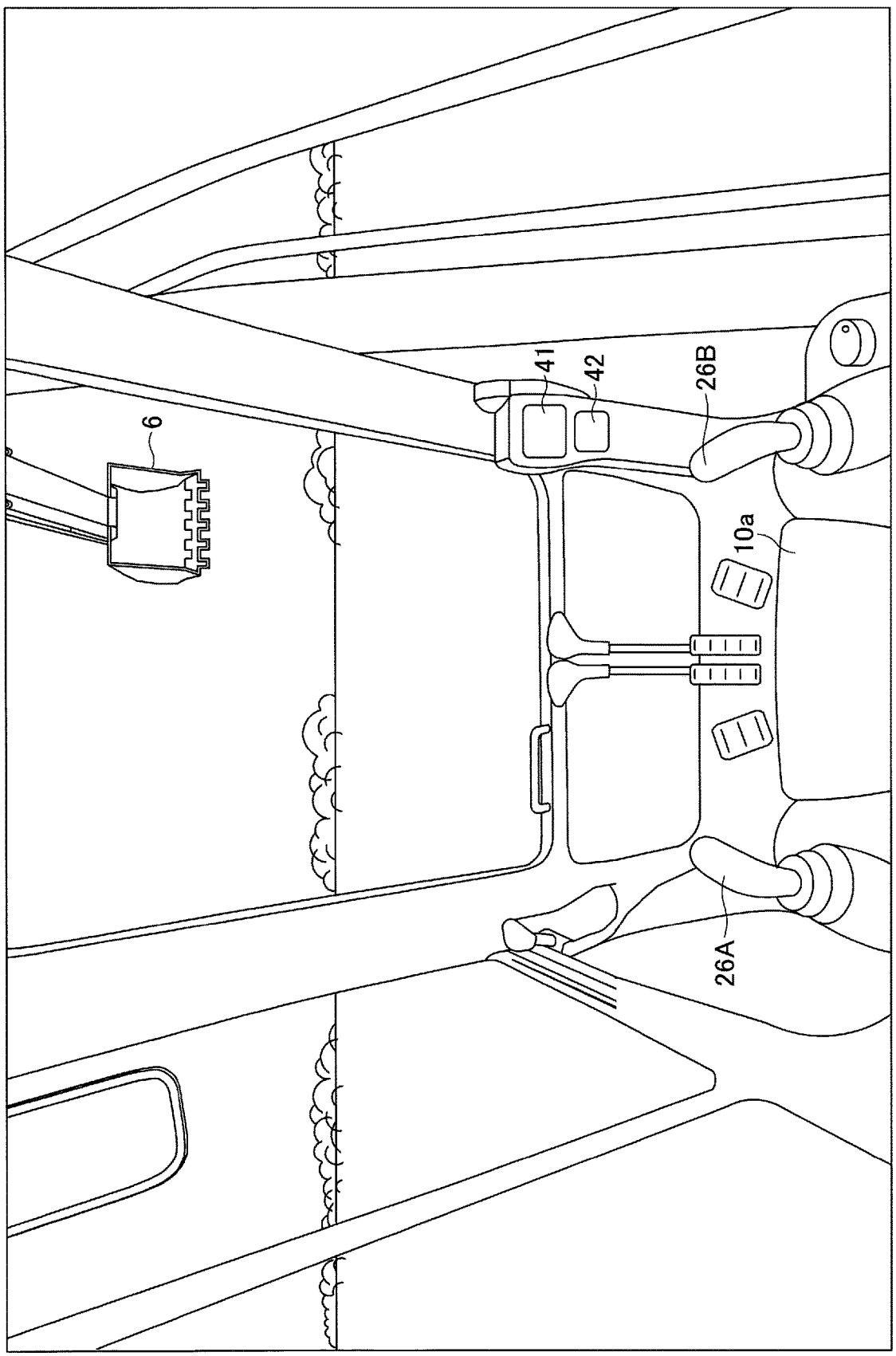
FIG. 5 is a diagram illustrating a forward looking view from an operator seat in a cabin of the shovel.

FIG. 4 is a diagram illustrating the shovel performing the work of excavating a slope (an inclined surface) with the bucket 6 according to the embodiment. FIG. 5 is a diagram illustrating a forward looking view from an operator seat in the cabin 10 of the shovel according to the embodiment.

As illustrated in FIG. 5, the bucket 6 can be seen from the front window of the cabin 10. In the cabin 10, an operator seat 10a is provided in the center, and the operating levers 26A and 26B are placed one on each side of the operator seat 10a. The operator is seated on the operator seat 10a and performs excavation work by moving the bucket 6 to a desired position by operating the operating lever 26A with the left hand and operating the operating lever 26B with the right hand.

The image display part 41 and the switch panel 42 of the display device 40 are placed on the front right of the operator seat 10a (on the lower right of the front window). The operator of the shovel operates the operating levers 26A and 26B, etc., with both hands while looking at the bucket 6 outside the window, reading work information from the image display part 41 that comes into sight.

Here, the operator gazes at the bucket 6 outside the window during operations. Therefore, it is difficult for the operator to read the details of the information displayed on the image display part 41 that is in sight.

Therefore, according to this embodiment, the image display part 41 of the display device 40 displays multiple distance indicating parts indicating relative distances to the target surface, with respect to the width direction of the bucket 6. Such display control is described below.

Next, a display screen configuration of a display screen 41S of the image display part 41 during slope excavating work is described with reference to FIGS. 6 through 9.

Figure 6:
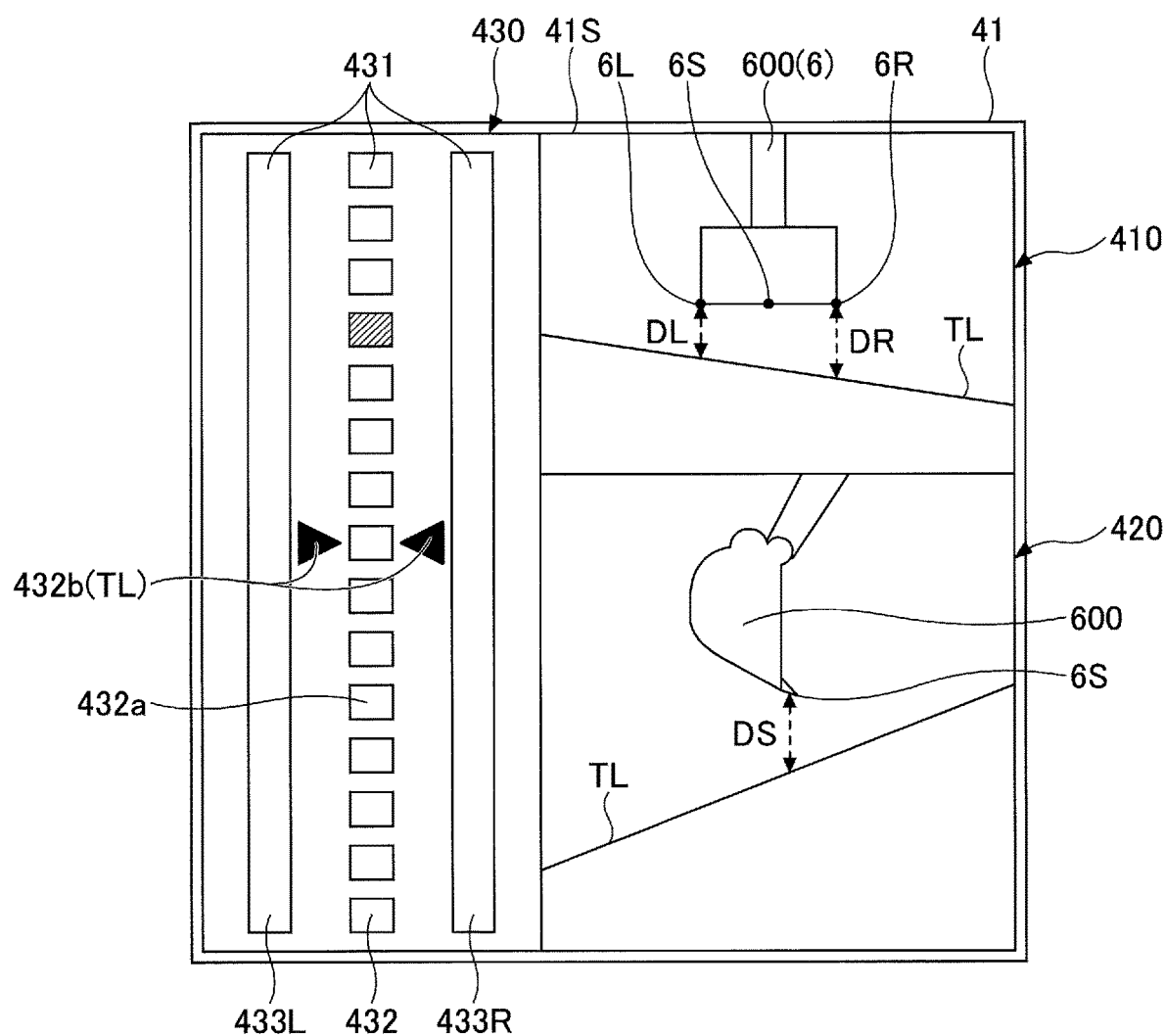
FIG. 6 is a diagram illustrating an example display on a display screen in the case where a bucket is at a position distant from a target surface.
Figure 7:
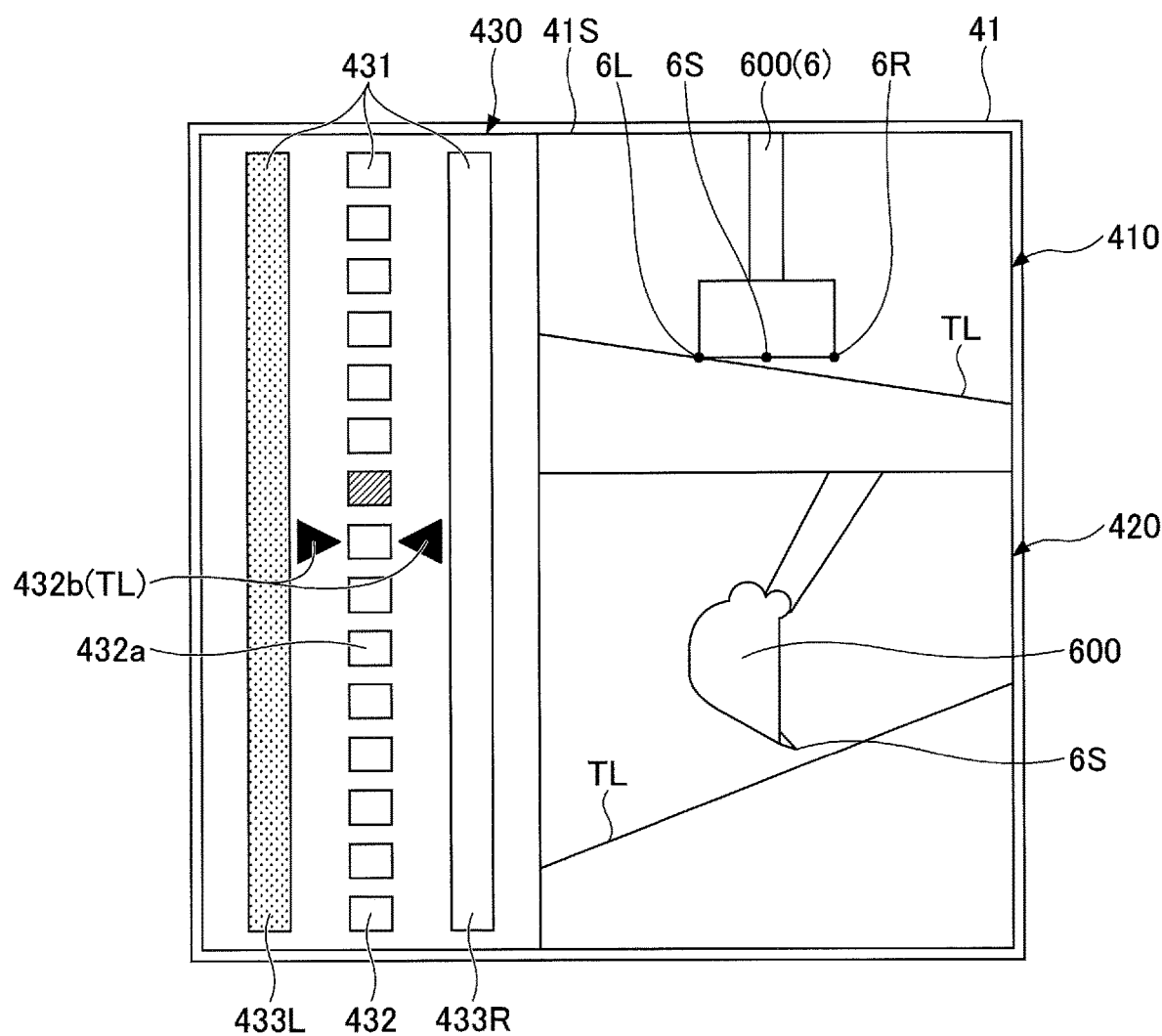
FIG. 7 is a diagram illustrating an example display on the display screen in the case where the bucket has approached the target surface.
Figure 8:
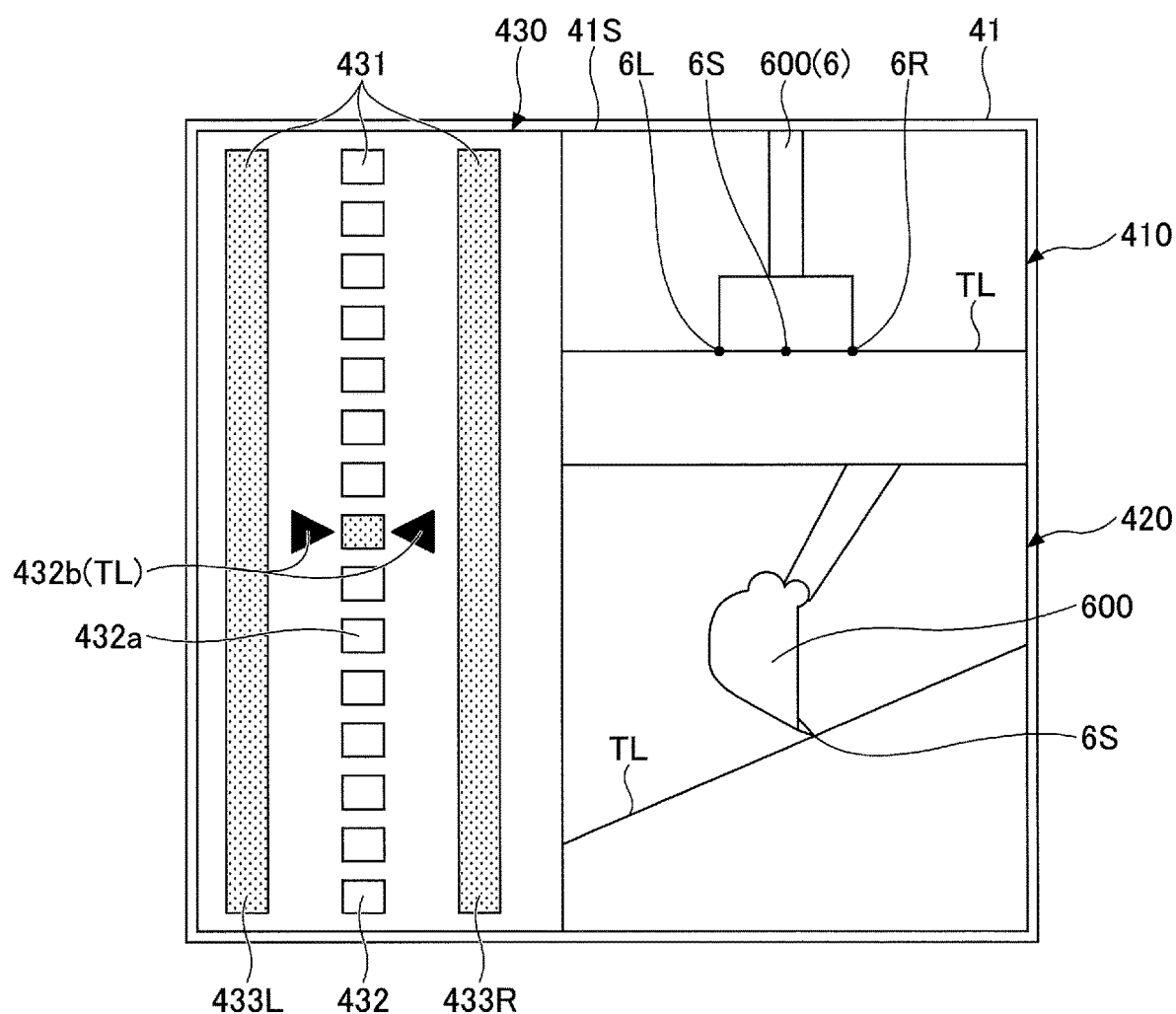
FIG. 8 is a diagram illustrating an example display on the display screen in the case where the bucket is at a position coinciding with the target surface.
Figure 9:
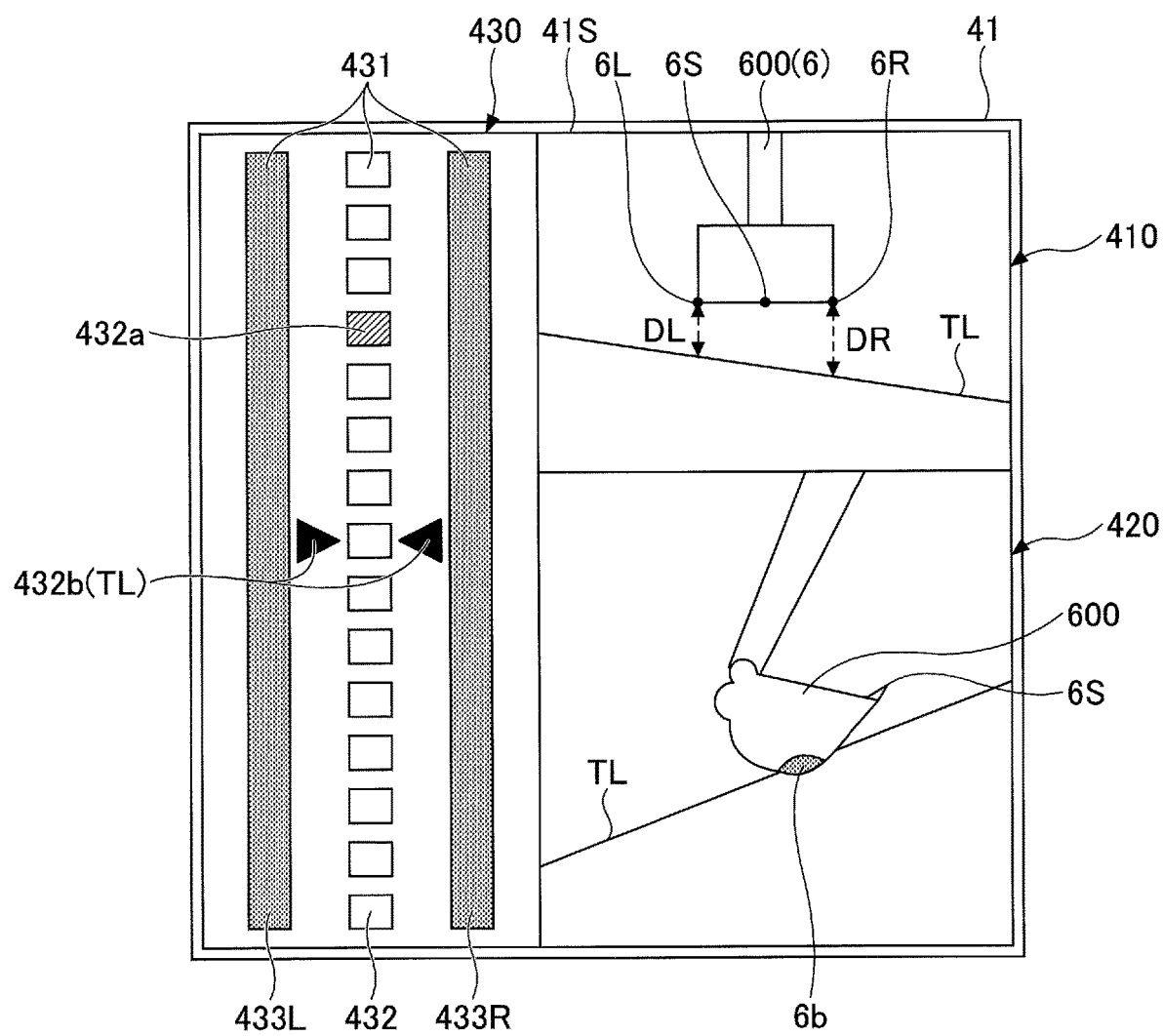
FIG. 9 is a diagram illustrating an example display on the display screen in the case where a back surface of the bucket is at a position contacting the target surface.

FIG. 6 is a diagram illustrating an example display on the display screen 41S in the case where the bucket 6 is at a position distant from a target surface in slope excavating work. FIG. 7 is a diagram illustrating an example display on the display screen 41S in the case where the bucket 6 has approached the target surface in slope excavating work. FIG. 8 is a diagram illustrating an example display on the display screen 41S in the case where the bucket 6 is at a position coinciding with the target surface in slope excavating work. FIG. 9 is a diagram illustrating an example display on the display screen 41S in the case where the back surface of the bucket 6 is at a position contacting the target surface in slope excavating work.

The display screen 41S includes a first target surface display image 410, a second target surface display image 420, and a distance display region 430, and displays various kinds of work information.

The first target surface display image 410 schematically displays the relationship between the bucket 6 and the target surface. In the first target surface display image 410, the bucket 6 and the target surface in a forward looking view from the shovel that the operator has when seated in the cabin 10 are schematically displayed with a bucket icon 600 and a target surface TL. The bucket icon 600 is shown in the shape of the bucket 6 viewed from the cabin 10.

The target surface TL may be displayed with the tilt angle of the bucket 6 relative to the actual target surface. A distance DR and a distance DL between the bucket icon 600 and the target surface TL are displayed in such a manner as to vary in accordance with the distance from the end of the actual bucket 6 to the target surface. Likewise, the tilt angle of the bucket 6 is displayed in such a manner as to vary in accordance with the positional relationship between the actual bucket 6 and target surface.

The operator can understand the positional relationship between the bucket 6 and the target surface and the inclination angle of the target surface by viewing the first target surface display image 410. In particular, from the first target surface display image 410 illustrated in FIG. 6, it is possible to visually recognize with respect to the distance between the bucket icon 600 and the target surface TL that the distance DR from the position of a right side 6R of the teeth tips of the bucket icon 600 to the target surface TL is different from the distance DL from the position of a left side 6L of the teeth tips of the bucket icon 600 to the target surface TL.

The second target surface display image 420 schematically displays the relationship between the bucket 6 and the target surface viewed from the side. In the second target surface display image 420, the bucket icon 600 and the target surface TL are displayed. The bucket icon 600 is shown in the shape of the bucket 6 viewed from the side. The target surface TL may be displayed with an inclination angle relative to a horizontal plane. A distance DS between the bucket icon 600 and the target surface TL is the distance from the position of a center 6S of the teeth tips of the bucket icon 600 illustrated in the first target surface display image 410 to the target surface TL. The distance DL is displayed in such a manner as to vary in accordance with the distance from the position of the center of the teeth tips of the actual bucket 6 to the target surface. The inclination angle is displayed in such a manner as to vary in accordance with the positional relationship between the actual bucket 6 and target surface.

The operator can understand the positional relationship between the bucket 6 and the target surface and the inclination angle of the target surface by viewing the second target surface display image 420.

The distance display region 430 includes multiple distance indicating parts 431 that schematically indicate distances to the target surface, with respect to the width direction of the bucket 6.

The distance indicating part 431 placed in the central position is a graph display part 432 serving as a first distance display part. The distance indicating parts 431 placed one on each side of the graph display part 432 are distance indicator display parts 433 serving as a second distance display part, of which one on the right side is a distance indicator display part 433R and of which one on the left side is a distance indicator display part 433L.

The graph display part 432 displays the distance from the position of the center of the teeth tips of the bucket 6 as the representative position to the target surface.

The graph display part 432 according to this embodiment displays the distance from the position of the center 6S of the teeth tips of the bucket icon 600 shown in the first target surface display image 410 to the target surface TL. The graph display part 432 is a bar graph in which display segments 432a serving as multiple display parts are vertically arranged at regular intervals. In the graph display part 432, one of the fifteen display segments 432a is displayed in a color (for example, black) different from that of the other display segments 432a in accordance with the distance from the position of the center of the teeth tips of the bucket 6 to the target surface. The display segment 432a displayed in the different color serves as a bucket position display part (the fourth display part from the top in FIG. 6). The bucket position display part is displayed in such a manner as to vertically move in accordance with the distance from the position of the center of the teeth tips of the bucket 6 to the target surface.

According to this embodiment, the eighth display segment 432a from the top is the position of the target surface. Target indicating parts 432b indicating the position of the target surface are placed one on each lateral side of the eighth display segment 432a from the top.

When the position of the center of the teeth tips of the bucket 6 coincides with the target surface, the bucket position display part is the eighth display segment 432a as illustrated in FIG. 8, and the display segment 432a may be displayed in green. When the bucket 6 is below the target surface, the bucket position display part may be displayed in a color indicating a warning, such as red.

With respect to the bucket 6, as shown by the first target surface display image 410 of FIG. 6, the distance DR from the position of the right side 6R of the teeth tips of the bucket icon 600 to the target surface TL may be different from the distance DL from the position of the left side 6L of the teeth tips of the bucket icon 600 to the target surface TL. According to this embodiment, the distance indicator display part 433R displays the distance between the position of the right side of the teeth tips of the bucket 6 and the target surface, and the distance indicator display part 433L displays the distance between the position of the left side of the teeth tips of the bucket 6 and the target surface.

The distance indicator display part 433R and the distance indicator display part 433L are vertically elongated one-piece bars. According to this embodiment, the distance indicator display part 433R and the distance indicator display part 433L are displayed in different colors in accordance with the distance from the left or right position of the teeth tips of the bucket 6 to the target surface.

When the bucket 6 is distant from the target surface TL as illustrated in FIG. 6, the distance indicator display part 433R and the distance indicator display part 433L are displayed in, for example, white. When the position of the left side 6L of the teeth tips of the bucket 6 coincides with the target surface TL as illustrated in FIG. 7, the distance indicator display part 433L is displayed in, for example, green. At this point, the distance indicator display part 433R remains displayed in white. When the position of the right side 6R of the teeth tips and the position of the left side 6L of the teeth tips of the bucket 6 both coincide with the target surface TL as illustrated in FIG. 8, the distance indicator display parts 433R and 433L are displayed in green.

The distance indicator display part 433R and the distance indicator display part 433L of this embodiment also display the distance between the back surface of the bucket 6 and the target surface. During excavation work, for example, a back surface 6b of the bucket 6 may contact the target surface TL as illustrated in FIG. 9. The position of the teeth tips of the bucket 6 at this point is above the target surface TL.

When the back surface 6b of the bucket 6, which is a position other than the representative position, contacts the target surface TL to go beneath the target surface TL as illustrated in FIG. 9, the inside of the frames of the distance indicator display part 433R and the distance indicator display part 433L turns red to draw the operator's attention. At this point, the controller 30 may issue an alarm to the operator through the audio output device 43.

According to the display configuration illustrated in FIG. 9, in addition to changing display colors, it is also possible to periodically change display density (to light off intermittently or light up intermittently) or change the shape of (widen or elongate) a bar. A suitable combination of changing colors, lighting off intermittently or lighting up intermittently, and changing a shape makes it possible to further improve the visibility. Furthermore, in the second target surface display image 420, the color of the contacting area of the back surface 6b of the bucket 6 may be changed to, for example, red. The area of a color change is not limited to the contact area, and may be the entire bucket 6. By thus changing a schematic form of display based on information on positions other than the representative position, the operator can immediately stop operations particularly when a part of the bucket 6 other than the representative position goes beneath the target surface TL. This makes it possible to reduce the occurrence of additional work such as backfilling.

By looking at the distance display region 430, the operator can intuitively understand the distance from the position of the center of the teeth tips of the bucket 6 to the target surface and the distance from each of the position of the right side of the teeth tips and the position of the left side of the teeth tips of the bucket 6 to the target surface. Furthermore, the distance indicator display parts 433R and 433L display the contact of the back surface of the bucket 6 with the target surface by changing a form of display (changing a color). Accordingly, the operator can easily distinguish FIGS. 6 and 9 in which the position of the teeth tips of the bucket 6 is the same, and can efficiently perform excavation work along the target surface with high accuracy.

Figure 10:
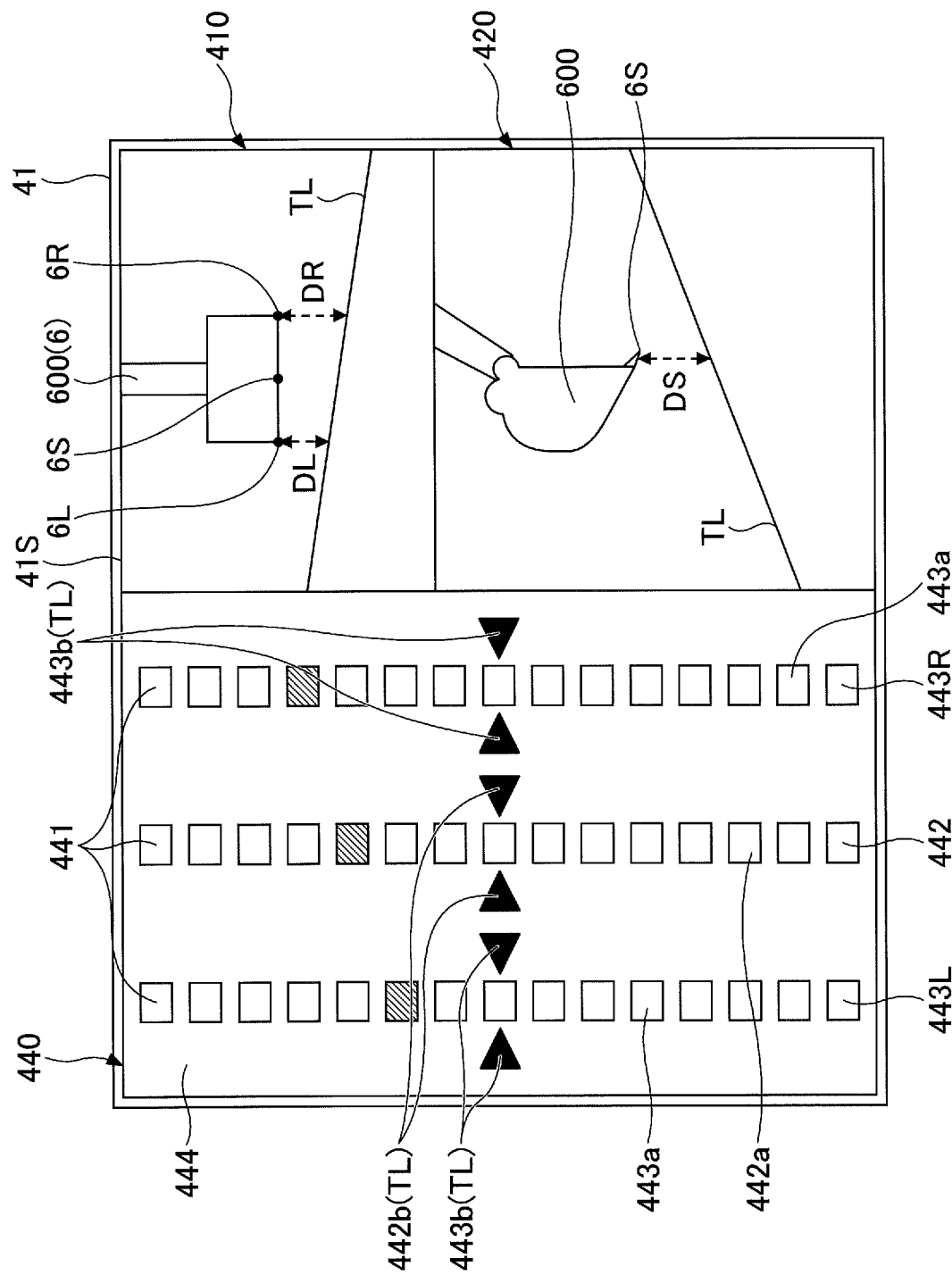
FIG. 10 is a diagram illustrating another example display in the case where the bucket is at a position distant from the target surface.
Figure 11:
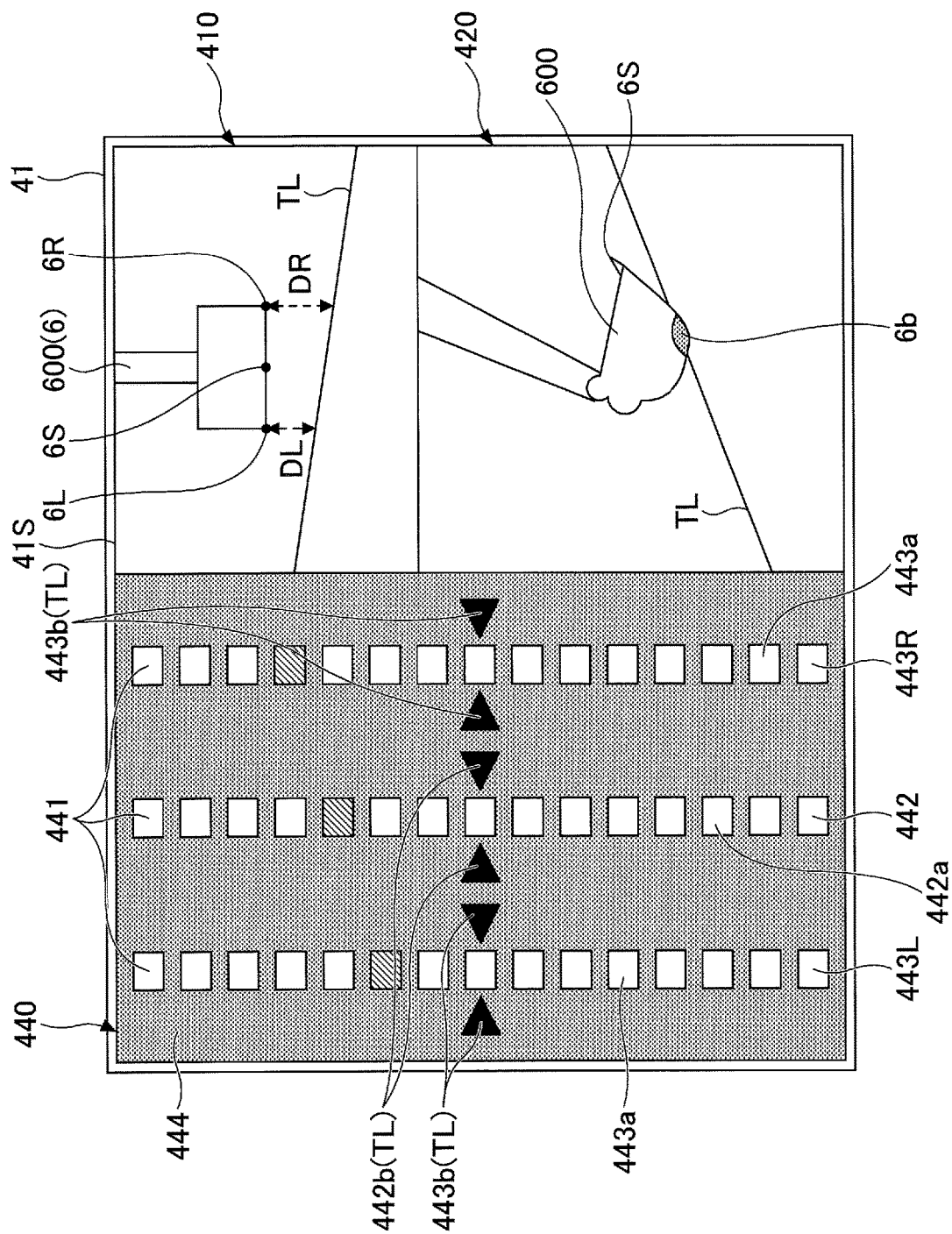
FIG. 11 is a diagram illustrating another example display in the case where the back surface of the bucket is at a position contacting the target surface.

Next, a variation of the display configuration illustrated in FIGS. 6 through 9 is described with reference to FIGS. 10 and 11. FIG. 10 is a diagram illustrating another example display on the display screen 41S in the case where the bucket 6 is at a position distant from a target surface in slope excavating work. FIG. 11 is a diagram illustrating another example display on the display screen 41S in the case where the back surface of the bucket 6 is at a position contacting the target surface in slope excavating work. In the following, a description of the same display configuration as in FIGS. 6 through 9 is omitted, and a description is given mainly of differences.

A distance display region 440 different from the above-described distance display region 430 is displayed in the left-side region of the display screen 41S illustrated in FIG. 10. The distance display region 440 makes it possible to visually recognize the respective distances of the position of the center, the position of the right side, and the position of the left side of the bucket 6 to the target surface separately.

The distance display region 440 includes multiple distance indicating parts 441 that schematically indicate the distance between each point on the bucket 6 and the target surface, with respect to the width direction of the bucket 6.

The distance indicating part 441 placed in the central position is a graph display part 442 serving as a first distance display part. The distance indicating parts 441 placed one on each side of the graph display part 442 are graph display parts 443 serving as a second distance display part, of which one on the right side is a graph display part 443R and of which one on the left side is a graph display part 443L. According to this embodiment, the first distance display part and the second distance display part are of the same form of display.

The graph display part 442 is a bar graph in which display segments 442a are vertically arranged at regular intervals. The graph display part 442 displays the distance from the position of the center of the teeth tips of the bucket 6 to the target surface. In the graph display part 442, one of the fifteen display segments 442a is displayed in a color (for example, black) different from that of the other display segments 442a in accordance with the distance from the position of the center of the teeth tips of the bucket 6 to the target surface. The display segment 442a displayed in the different color serves as a bucket position display part (the fifth display part from the top in FIG. 10). The bucket position display part is displayed in such a manner as to vertically move in accordance with the distance from the position of the center of the teeth tips of the bucket 6 to the target surface.

The graph display part 443R and the graph display part 443L have the same display configuration as the above-described graph display part 442.

In the graph display part 442, the graph display part 443R, and the graph display part 443L, the eighth display segment 442a or 443a from the top is the position of the target surface. Target indicating parts 442b and 443b indicating the position of the target surface are placed one on each lateral side of the eighth display segments 442a and 443a from the top, respectively.

When the position of the center of the teeth tips of the bucket 6 coincides with the target surface, the graph display part 442 may display the display segment 442a of the bucket position display part in green as illustrated in FIG. 8. When the bucket 6 is below the target surface, the bucket position display part may be displayed in a color indicating a warning, such as red. In the graph display part 443R and the graph display part 443L, the same form of display as in the above-described graph display part 442 is implemented.

The distance display region 440 includes a display region 444 provided separately from the distance indicating parts 441. The display region 444 is a region that serves as the background of the distance indicating parts 441.

The display region 444 according to this embodiment displays the distance between the back surface of the bucket 6 and the target surface. During excavation work, for example, the back surface 6b of the bucket 6 may contact the target surface TL as illustrated in FIG. 11. The position of the teeth tips of the bucket 6 at this point is above the target surface TL.

According to the display region 444 of this embodiment, when the back surface 6b of the bucket 6 contacts the target surface TL as illustrated in FIG. 11, the inside of the frame of the display region 444 turns red to draw the operator's attention. At this point, the controller 30 may issue an alarm to the operator through the audio output device 43.

According to the display configuration illustrated in FIG. 11, in addition to changing display colors, it is also possible to periodically change display density (to light off intermittently or light up intermittently) or change the shape of (widen or elongate) the frame. A suitable combination of changing colors, lighting off intermittently or lighting up intermittently, and changing a shape makes it possible to further improve the visibility. Furthermore, in the second target surface display image 420, the color of the contacting area of the back surface 6b of the bucket 6 may be changed to, for example, red. The area of a color change is not limited to the contact area, and may be the entire bucket 6.

Figure 12:
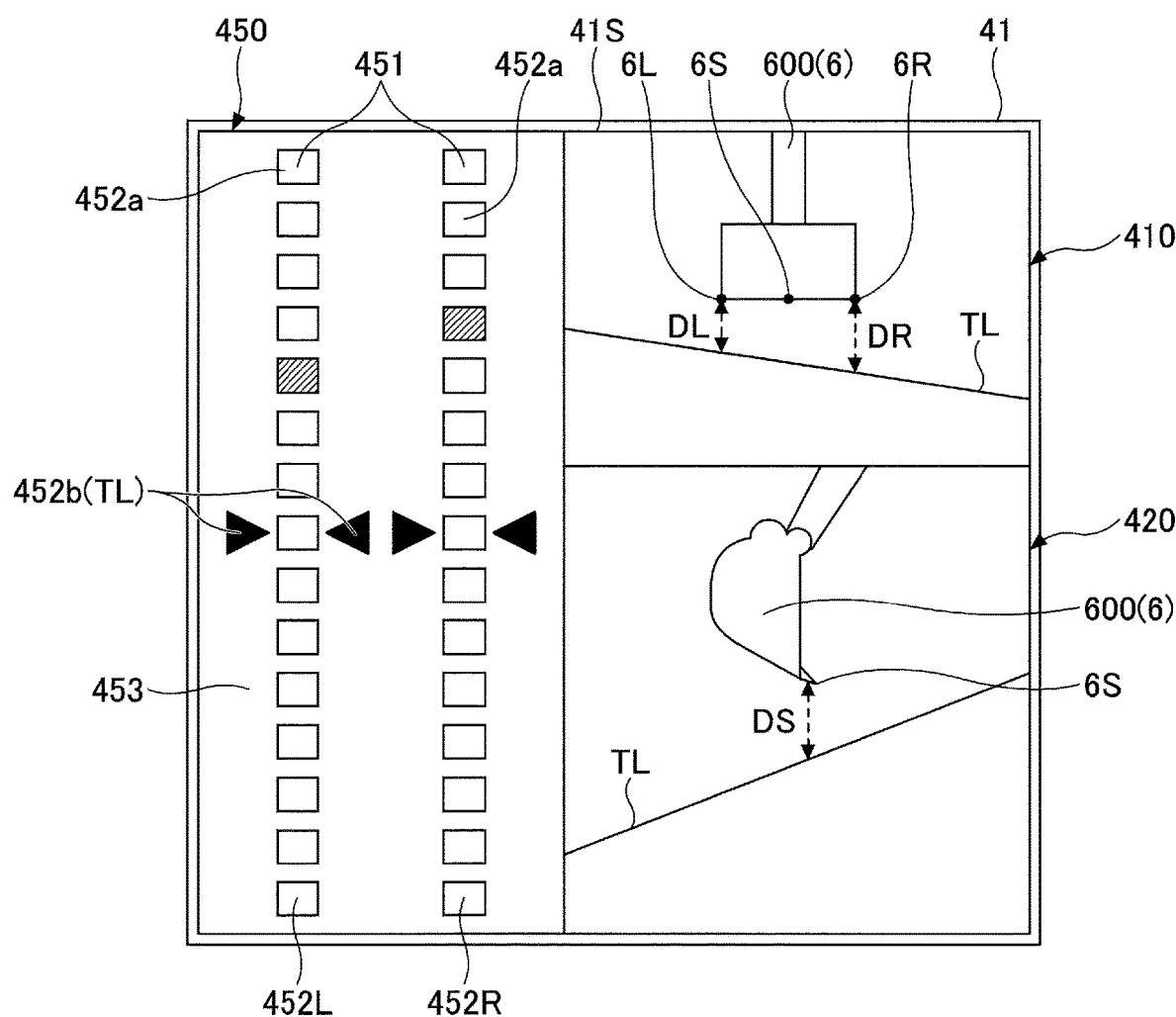
FIG. 12 is a diagram illustrating yet another example display in the case where the bucket is at a position distant from the target surface.
Figure 13:
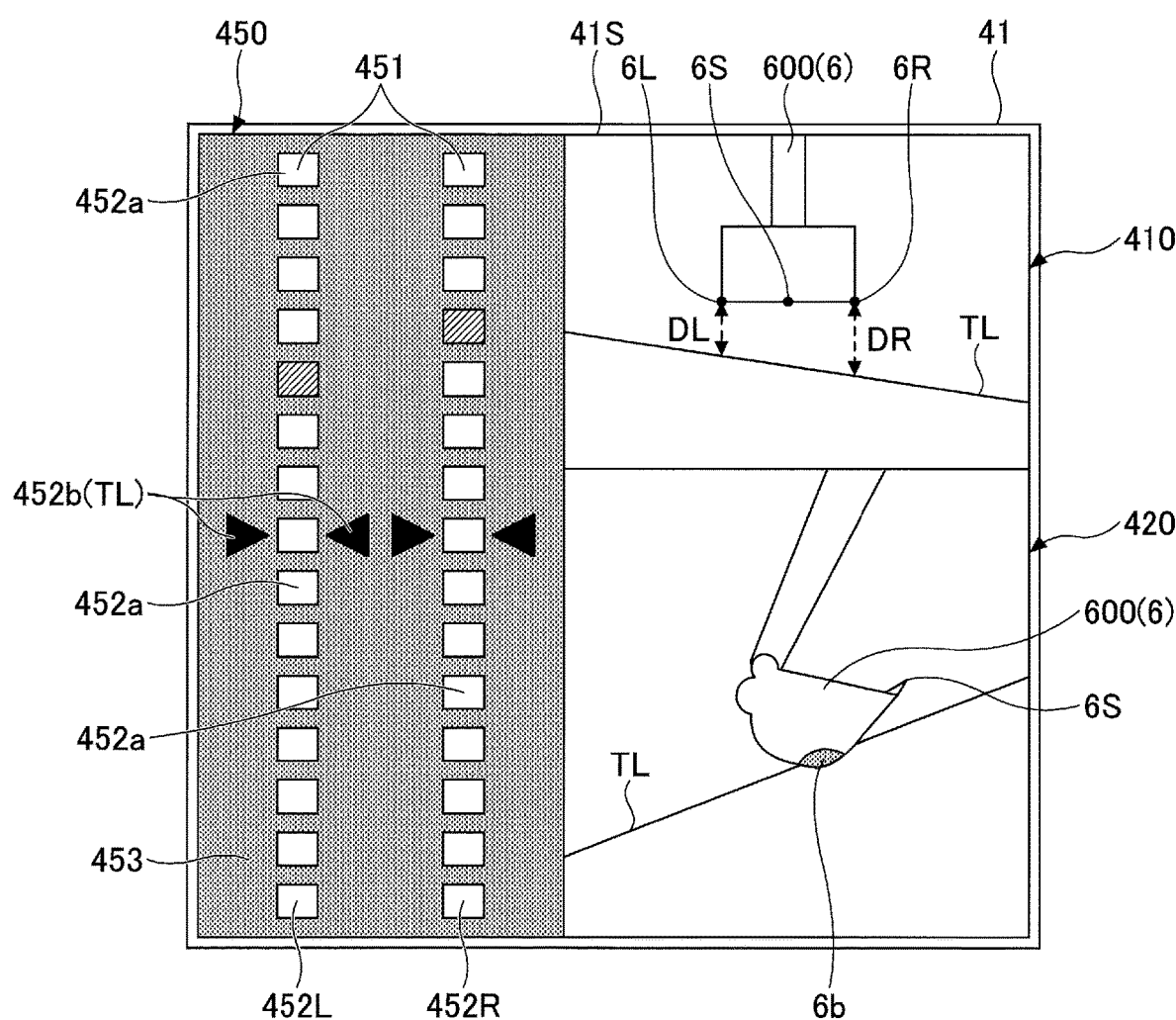
FIG. 13 is a diagram illustrating yet another example display in the case where the back surface of the bucket is at a position contacting the target surface.

Next, another variation of the display configuration illustrated in FIGS. 6 through 9 is described with reference to FIGS. 12 and 13. FIG. 12 is a diagram illustrating yet another example display on the display screen 41S in the case where the bucket 6 is at a position distant from a target surface in slope excavating work. FIG. 13 is a diagram illustrating yet another example display on the display screen 41S in the case where the back surface of the bucket 6 is at a position contacting the target surface in slope excavating work. In the following, a description of the same display configuration as in FIGS. 6 through 11 is omitted, and a description is given mainly of differences.

A distance display region 450 different from the above-described distance display region 430 is displayed in the left-side region of the display screen 41S illustrated in FIG. 12. The distance display region 450 makes it possible to visually recognize the respective distances of the position of the right side and the position of the left side of the bucket 6 to the target surface separately.

The distance display region 450 includes multiple distance indicating parts 451 that schematically indicate the distance between each point on the bucket 6 and the target surface, with respect to the width direction of the bucket 6.

The distance indicating part 451 placed on the right side is a graph display part 452R serving as a first distance display part. The distance indicating part 451 placed on the left side is a graph display part 452L serving as the first distance display part.

The graph display part 452R is a bar graph in which display segments 452a are vertically arranged at regular intervals. The graph display part 452R displays the distance from the position of the right side of the teeth tips of the bucket 6 to the target surface. In the graph display part 452R, one of the fifteen display segments 452a is displayed in a color (for example, black) different from that of the other display segments 452a in accordance with the distance from the position of the right side of the teeth tips of the bucket 6 to the target surface. The display segment 452a displayed in the different color serves as a bucket position display part (the fourth display part from the top in FIG. 12). The bucket position display part is displayed in such a manner as to vertically move in accordance with the distance from the position of the right side of the teeth tips of the bucket 6 to the target surface.

The graph display part 452L has the same display configuration as the above-described graph display part 452R.

In the graph display part 452R and the graph display part 452L, the eighth display segment 452a from the top is the position of the target surface. Target indicating parts 452b indicating the position of the target surface are placed one on each lateral side of the eighth display segments 452a from the top.

When the position of the right side of the teeth tips of the bucket 6 coincides with the target surface, the graph display part 452R may display the display segment 452a of the bucket position display part in green as illustrated in FIG. 8. In the graph display part 452L, the same display is performed when the position of the left side of the teeth tips of the bucket 6 coincides with the target surface. When the bucket 6 is below the target surface, the bucket position display part may be displayed in a color indicating a warning, such as red.

The distance display region 450 includes a display region 453 provided separately from the distance indicating parts 451. The display region 453 is a region that serves as the background of the distance indicating parts 451.

The display region 453 according to this embodiment displays the distance between the back surface of the bucket 6 and the target surface. During excavation work, for example, the back surface 6b of the bucket 6 may contact the target surface TL as illustrated in FIG. 13. The position of the teeth tips of the bucket 6 at this point is above the target surface TL.

According to the display region 453 of this embodiment, when the back surface 6b of the bucket 6 contacts the target surface TL as illustrated in FIG. 13, the inside of the frame of the display region 453 turns red to draw the operator's attention. At this point, the controller 30 may issue an alarm to the operator through the audio output device 43.

According to the display configuration illustrated in FIG. 13, in addition to changing display colors, it is also possible to periodically change display density (to light off intermittently or light up intermittently) or change the shape of (widen or elongate) the frame. A suitable combination of changing colors, lighting off intermittently or lighting up intermittently, and changing a shape makes it possible to further improve the visibility. Furthermore, in the second target surface display image 420, the color of the contacting area of the back surface 6b of the bucket 6 may be changed to, for example, red. The area of a color change is not limited to the contact area, and may be the entire bucket 6.

In addition to those described above, the display screen 41S may include a fuel efficiency display part to display fuel efficiency and a hydraulic oil temperature display part to display the temperature condition of hydraulic oil in a hydraulic oil tank. The display screen 41S may further include a remaining aqueous urea solution amount display part, a remaining fuel amount display part, and a coolant water temperature display part. Furthermore, the form of display of the regions is not limited to the illustration of this embodiment. Furthermore, the arrangement of the regions is not limited to the configuration illustrated in this embodiment. Moreover, in the case where an image capturing device is mounted on the shovel, the display screen 41S may display a camera image in addition to those described above.

Figure 14:
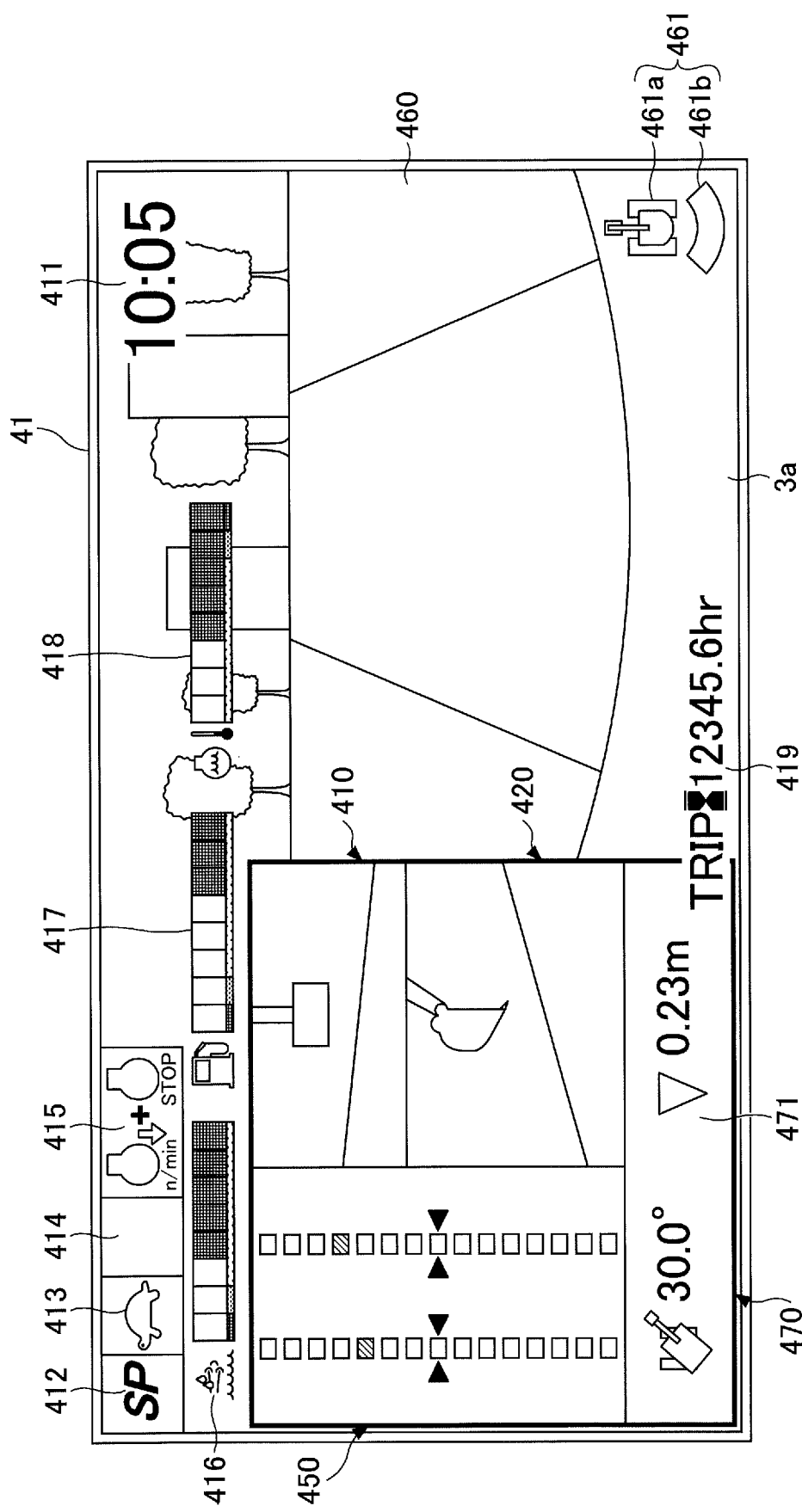
FIG. 14 is a diagram illustrating another example of an image displayed on an image display part.

FIG. 14 is a diagram illustrating another example of the image displayed on the image display part 41. The display screen 41S illustrated in FIG. 14 includes a time display part 411, a rotational speed mode display part 412, a traveling mode display part 413, an attachment display part 414, an engine control status display part 415, a remaining aqueous urea solution amount display part 416, a remaining fuel amount display part 417, a coolant water temperature display part 418, an engine operating time display part 419, a captured image display part 460, and a work guidance display part 470.

The time display part 411 displays a current time. In the illustration of FIG. 14, a current time (10:05) is shown.

The rotational speed mode display part 412 displays a rotational speed mode. In the illustration of FIG. 14, a symbol "SP" representing SP mode is displayed.

The traveling mode display part 413 displays a traveling mode. For example, the traveling mode includes a low-speed mode and a high-speed mode. A "turtle"-shaped mark is displayed in the low-speed mode, and a "rabbit"-shaped mark is displayed in the high-speed mode. In the illustration of FIG. 14, the "turtle"-shaped mark is displayed.

The attachment display part 414 displays, for example, an image representing an attachment that is attached.

The engine control status display part 415 displays the control status of the engine 11. In the illustration of FIG. 14, "automatic deceleration and automatic stop mode" is selected as the control status of the engine 11. The "automatic deceleration and automatic stop mode" means a control status to automatically reduce the engine rotational speed in accordance with the duration of a condition in which the engine load is low and to automatically stop the engine 11 when the condition of the low engine load further continues. Other control statuses of the engine 11 include "automatic deceleration mode," "automatic stop mode," "manual deceleration mode," etc.

In the remaining aqueous urea solution amount display part 416, a bar graph representing the status of the remaining amount of an aqueous urea solution stored in an aqueous urea solution tank is displayed.

In the remaining fuel amount display part 417, a bar graph representing the status of the remaining amount of fuel stored in a fuel tank is displayed.

In the coolant water temperature display part 418, a bar graph representing the temperature condition of engine coolant water is displayed.

The engine operating time display part 419 displays the cumulative operating time of the engine 11. A cumulative operating time since the manufacture of the shovel or a cumulative operating time since the restart of a timer by the operator is displayed in the engine operating time display part 419.

In the captured image display part 460, an image captured by an image capturing device is displayed, and for example, an image captured by a back-side monitoring camera, a left-side monitoring camera, or a right-side monitoring camera is displayed.

In the captured image display part 460, an image capturing device icon 461 representing the orientation of an image capturing device that has captured an image that is being displayed is displayed. The image capturing device icon 461 is composed of a shovel icon 461a representing the shape of the shovel in a plan view and a strip-shaped orientation indicator icon 461b representing the orientation of the image capturing device that has captured the image that is being displayed.

In the illustration of FIG. 14, the orientation indicator icon 461b is displayed below the shovel icon 461a (on the opposite side from the attachment) to indicate that an image of an area behind the shovel captured with the back-side monitoring camera is displayed in the captured image display part 460.

For example, the operator can switch an image to display in the captured image display part 460 to an image captured by another camera by depressing an image switch button provided in the cabin 10.

If the shovel is provided with no image capturing devices, different information may be displayed in place of the captured image display part 460.

The above-described rotational speed mode display part 412, traveling mode display part 413, attachment display part 414, engine control status display part 415, and image capturing device icon 461 constitute a settings display part indicating the settings of the shovel. Furthermore, the remaining aqueous urea solution amount display part 416, the remaining fuel amount display part 417, the coolant water temperature display part 418, and the engine operating time display part 419 constitute an operating condition display part indicating the operating condition of the shovel.

In the work guidance display part 470, for example, an image including the distance indicating parts 451 indicating relative distances to the target surface with respect to the width direction of the bucket 6, as described above with reference to FIG. 12, is displayed. Furthermore, here, the relative angle (30.0°) of the orientation of the shovel relative to the target surface is displayed as a numerical information image 471 along with an icon representing the shovel. In addition, as the numerical information image 471, the relative distance (0.23 m) between the position of the right side of the teeth tips or the position of the left side of the teeth tips of the bucket 6, which is preset, and the target surface is displayed along with a predetermined icon.

Furthermore, for example, when the shovel is in operation, the image illustrated in FIG. 12 may be displayed in the image display part 41, and when the shovel is not in operation, the image illustrated in FIG. 14 may be displayed in the image display part 41. Whether the shovel is in operation or not may be determined by the controller 30 based on the detection results of the pressure sensors 15a and 15b, for example.

A shovel according to an embodiment is described above. The present invention, however, is not limited to the above-described embodiment, and variations and modifications may be made without departing from the scope of the present invention.

What is claimed is:

1. A shovel comprising:
 a traveling undercarriage;
 an upper rotating structure swingably mounted on the traveling undercarriage;
 an attachment attached to the upper rotating structure and including a boom, an arm, and a bucket;
 a guidance device configured to guide an operation of the attachment; and
 a display device configured to display information related to work by the attachment,
 wherein the guidance device is configured to display a plurality of distance indicating parts on the display device, the distance indicating parts schematically indicating multiple relative distances from multiple points on the bucket to a preset target surface, the multiple points being arranged in a width direction of the bucket,
 the plurality of distance indicating parts include a first indicating part and a second indicating part, the first indicating part indicating a first relative distance from a first point among the multiple points to the preset target surface, the second indicating part indicating a second relative distance from a second point among the multiple points to the preset target surface, and the first point is to a left of the second point in a forward looking view from a cabin of the shovel, and the first indicating part is displayed to a left of the second indicating part on the display device.

2. The shovel as claimed in claim 1, wherein the guidance device is configured to display relative distances from teeth tips and a back surface of the bucket to the preset target surface on the display device.

3. The shovel as claimed in claim 1, wherein
the first point is a representative position of the bucket and the preset target surface; and
the second point is a position of the bucket other than the representative position and the preset target surface.

4. The shovel as claimed in claim 3, wherein the first indicating part is formed of a vertical arrangement of a plurality of display parts.

5. The shovel as claimed in claim 3, wherein the second indicating part is configured to indicate the second relative distance by changing a color or density.

6. The shovel as claimed in claim 3, wherein the second indicating part is displayed in a same faun of display as the first indicating part.

7. The shovel as claimed in claim 3, wherein a relative distance between a back surface of the bucket and the preset target surface is displayed by a change in a form of display of the second indicating part.

8. The shovel as claimed in claim 1, wherein the distance indicating parts are formed of a vertical arrangement of a plurality of display parts.

9. The shovel as claimed in claim 1, wherein a relative distance between a back surface of the bucket and the preset target surface is displayed by a change in a form of display of a display region provided separately from the distance indicating parts.

10. The shovel as claimed in claim 9, wherein the change in the separately provided display region is a change in a color of the bucket.

11. The shovel as claimed in claim 1, wherein each of the first indicating part and the second indicating part is a bar-shaped or bar graph indicator.

12. The shovel as claimed in claim 11, wherein
the first indicating part has a fixed shape that remains unchanged as the first relative distance changes, and
the second indicating part has a fixed shape that remains unchanged as the second relative distance changes.

* * * * *